United States Patent [19]

Miller

[11] Patent Number: 4,792,899
[45] Date of Patent: Dec. 20, 1988

[54] MICROPROCESSOR SUPPORT INTEGRATED CIRCUIT

[75] Inventor: Ira Miller, Tempe, Ariz.

[73] Assignee: Motorola, Inc., Schaumburg, Ill.

[21] Appl. No.: 1

[22] Filed: Jan. 2, 1987

[51] Int. Cl.⁴ .......................... G05F 3/20; G10L 5/00; G04B 1/00
[52] U.S. Cl. .................................. 364/200; 323/317; 363/17; 363/63; 307/359
[58] Field of Search ... 364/200 MS File, 900 MS File; 368/204; 381/51

[56] References Cited

U.S. PATENT DOCUMENTS

| | | | |
|---|---|---|---|
| 4,206,397 | 6/1980 | Dahlke | 323/273 |
| 4,441,825 | 4/1984 | Morokawa | 368/204 |
| 4,584,517 | 4/1986 | Schwob | 323/222 |
| 4,627,093 | 12/1986 | Hashimoto et al. | 381/51 |
| 4,635,211 | 1/1987 | Yoshida et al. | 364/513.5 |
| 4,638,451 | 1/1987 | Hester et al. | 364/900 |
| 4,685,040 | 8/1987 | Steigerwald et al. | 363/17 |
| 4,692,641 | 9/1987 | Highton | 307/475 |
| 4,698,737 | 10/1987 | Miller et al. | 323/351 |
| 4,717,839 | 1/1988 | Miller | 307/359 |
| 4,733,163 | 3/1988 | Miller | 323/316 |

*Primary Examiner*—Gareth D. Shaw
*Assistant Examiner*—Viet Q. Nguyen
*Attorney, Agent, or Firm*—Michael D. Bingham

[57] ABSTRACT

A single chip integrated circuit is partitioned to support a microprocessor chip for providing the logic interface between a keyboard peripherally connected to a host computer. The support circuit includes in a single integrated chip a voltage regulator, a serial to parallel converter, a multiple output current source, an oscillator, a DC to DC converter, an audio driver and LED drivers. The voltage regulator produces a plurality of regulated output voltages utilized to operate the microprocessor and the internal circuitry of the support circuit and is comprised of a band gap regulator and output of which is coupled to an external resistor for providing a reference current. The current source is coupled to the voltage regulator and provides a plurality of output currents ratioed with respect to the reference current. The serial to parallel converter converts serial digital data supplied from the microprocessor into parallel data for controlling the operation of the audio and LED driver circuits. The LED driver circuit converts currents supplied thereto from the current source to a higher magnitude sufficient for driving individual LEDs. The audio driver circuit provides a logarithmic output current thereat as controlled by said data.

2 Claims, 1 Drawing Sheet

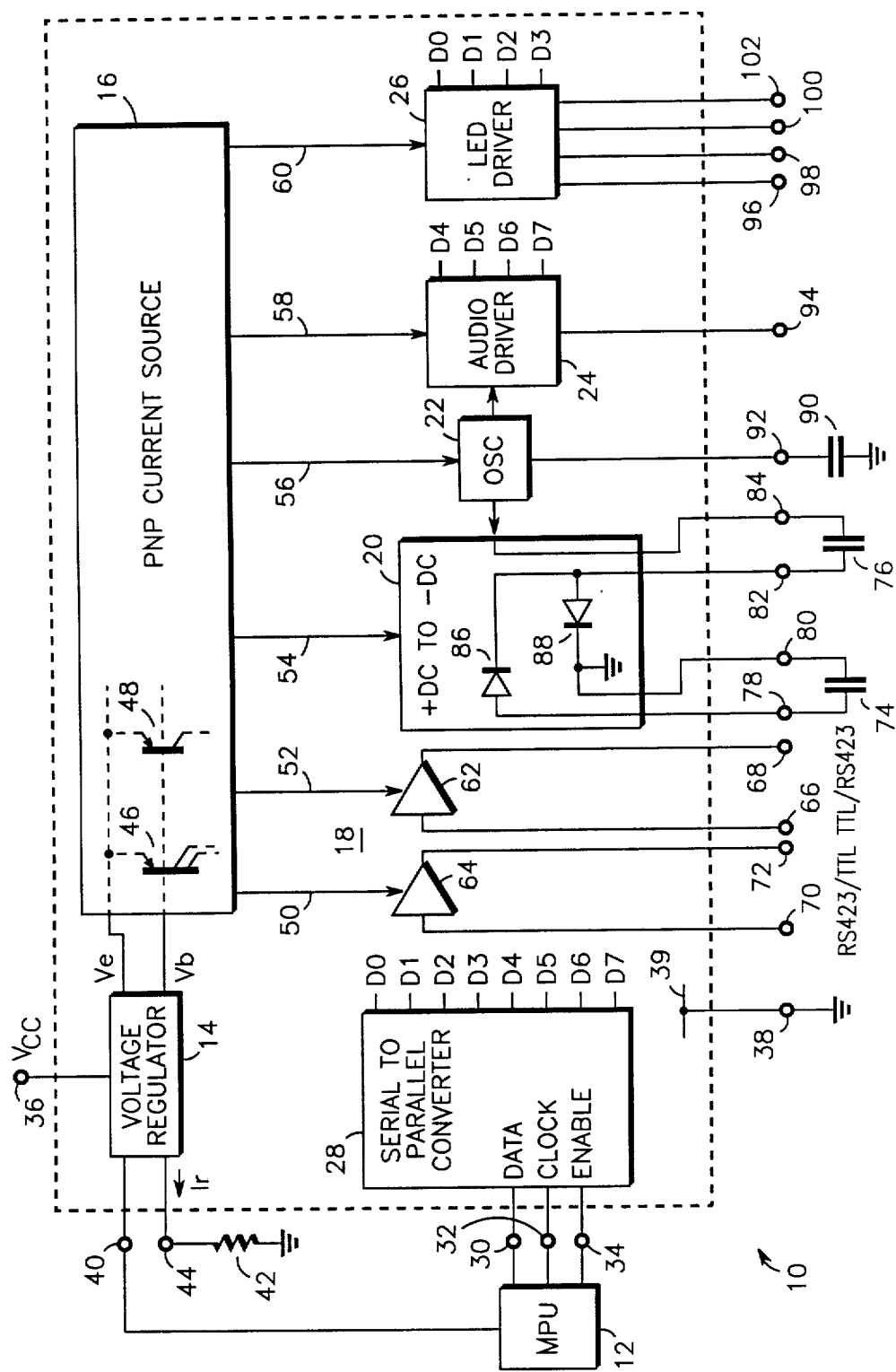

MICROPROCESSOR SUPPORT INTEGRATED CIRCUIT

CROSS REFERENCE TO RELATED APPLICATION

The present applications is related to the following U.S. patents filed on even date herewith and assigned to the assignee of the present invention:
"MERGED INTEGRATED OSCILLATOR CIRCUIT", by Ira Miller, U.S. Pat. No. 4,734,656;
"DIGITALLY CONTROLLED CURRENT SOURCE", by Ira Miller, U.S. Pat. No. 4,733,163;
"DC TO DC CONVERTER", by Ira Miller et al., U.S. Pat. No. 4,698,737: and
"TRANSISTOR COMPARATOR CIRCUIT HAVING SPLIT COLLECTOR FEEDBACK HYSTERESIS", by Ira Miller, U.S. Pat. No. 4,717,839.

BACKGROUND OF THE INVENTION

The present invention relates to computers and, more particularly, to an integrated circuit (IC) which interfaces with a microprocessor for providing support function therefor.

Conventional computer systems are usually comprised of a main frame computer that interfaces with a peripherally connected keyboard via a interfacing bus similar in appearance to the coiled cord connecting a telephone headset to a telephone.

The keyboard is an alpha-numeric "typewriter" style ASCII (American Standard Code for Information Interchange) keyboard for text editing and high-level language programming. The alpha-numeric entry from the typewriter keyboard is by nature serial, or one letter at a time, so nothing is lost by presenting the information from the approximately 128 keys, to the computer in a cost effective and asynchronous serial format. Electronics located at the keyboard not only debounce the pressed key but also codes its identity and transmits the information to the main frame computer via the connecting cable bus. Usually the keyboard electronics is Transistor Transistor Logic (TTL) compatible, having a high logic level of +2.4 volts and a low logic level of +0.4 volts, for providing an approximate 2 volt noise margin. However, when data is interfaced to other remote electronics, such as in the keyboard to main frame computer cable interface application, a higher noise margin is desirable and the data signals are generally converted to larger voltage swings.

For short distance applications, and where RFI (radio frequency interference) is a consideration, the RS423 standard is a good choice because the driver can be slew rate controlled and, by sloping the rise and fall times of the square wave type data, many of the high frequency components that can contribute to RFI are avoided. The RS423 standard provides a minimum of 7.2 volts of noise margin with a single ended driver output swing of $+/-3.6$ volts.

Most, if not all, prior art keyboard electronics as discussed above has been constructed of standard logic blocks using many discrete components and IC's. Improved performance and a more cost effective system may be achieved using a single integrated circuit for providing certain functions.

In order to reduce component cost, on board space and manufacturing costs a single-chip microprocessor may be utilized to provide the basic digital functions of the keyboard to main frame computer interface. However, there are some digital and linear functions that are required which either the microprocessor cannot do or cannot achieve efficiently.

Hence, a need exist for a microprocessor support IC to complement the standard single IC microprocessor and to provide functions in combination with the latter to provide a cost effective and improved keyboard to computer interface system.

SUMMARY OF THE INVENTION

Accordngly, it is an object of the present invention to provide an improved single integrated circuit for supporting a microprocessor system by providing functions required by such system.

It is another object of the present invention to provide a single integrated circuit for supporting a microprocessor system programmed to functionally simulate the logic interface electronics of a computer keyboard.

In accordance with the above and other objects there is provided a single integrated circuit including a voltage regulator for producing a plurality of regulated output voltages including a resistor externally coupled thereto for producing a reference current, a first converter responsive to serially applied digital data for providing control data signals in parallel, a current source coupled to the voltage regulator for providing a plurality of currents ratioed with respect to the reference current, a second converter circuit coupled to the current source and receiving a square wave for generating a regulated negative voltage, and oscillator including a capacitor externally coupled thereto for providing the square wave, an audio driver circuit coupled to the current source and being responsive to predetermined ones of the control data signals for generating a logarithmic function output current and a driver circuit coupled to the current source for generating output currents in response to receiving other predetermined control data signals which currents are suited for driving LEDs.

BRIEF DESCRIPTION OF THE DRAWING

The single Figure is a block diagram and schematic of the support IC of the present invention.

DETAILED DESCRIPTION OF THE PREFERRED EMBODIMENT

Turning to the single Figure there is shown support circuit 10 of the present invention which is fabricated in integrated circuit form using conventional bipolar process technology. As illustrated, support chip 10 interfaces with microprocessor (MPU) 12 and, as previously mentioned, in combination therewith functionally simulates the logic interface electronics that exists between a remote keyboard and a host computer. MPU 12 may, for instance, be realized by any available MPU such as the MC68HC05 microcontroller manufactured by Motorola, Inc. Support circuit 10 provides those functions which MPU 12 cannot do or cannot do efficiency. Briefly, support circuit 10 includes, on chip, voltage regulator 14 for providing bias both to MPU 12 and to internal circuitry of support circuit 10; a current source 16 for providing ratioed output currents to: translator 18, converter circuit 20, oscillator 22, audio driver circuit 24 and LED driver circuit 26. Serial to parallel converter 28 interfaces to the serial data port of MPU 12 at input 30 and provides parallel data output control signals $D_0$–$D_7$ to audio and LED drivers 24 and 26 respectively as converter 28 is clocked and enabled by MPU 12 via inputs 32 and 34.

Particularly, support circuit 10 provides positive and negative regulated voltages and is supplied a positive operating potential across terminals 36 and 38, the latter of which receives system ground potential that is supplied to internal circuitry via bus 39. Thus, regulator 14 provides a regulated +5 volts at output terminal 40 that is connected to MPU 12 to operate the same. In addition, this regulated +5 volts is level shifted to provide a nominal +7 volts (Ve) which is used for internal chip biasing. Further, regulator 14 provides a regulated positive voltage (Vb) which in conjunction with resistor 42 coupled externally at terminal 44 to regulator 14 provides an accurate and constant reference current Ir that is ratioed by PNP current source 16 as will be explained later. Voltage regulator 14 is generally known to those skilled in the art and is commonly referred to as a band gap regulator. The nominal band gap voltage (1.23 volts) is increased by a simple resistor divider network as understood to +5 volts. The regulated +5 volts as previously mentioned is level shifted by using a plurality of series connected diodes to establish Ve. The regulated band gap voltage may be buffered and level shifted through a buffer amplifier to establish Vb as is well understood. In the preferred embodiment a PNP transistor (not shown) was used having its base coupled to Vb and its collector-emitter conduction path coupled between Ve and terminal 44 to resistor 42 to provide Ir.

PNP current source 16 is conventional in structure and comprises a plurality of lateral PNP transistors, illustrated partially by transistors 46 and 48. In this manner Ir can be ratioed to any value by using either emitter degeneration resistors having ratioed resistance values or by using multi-segmented collectors for the PNP transistors as is well understood. Thus, a plurality of ratioed output currents are provided at outputs 50, 52, 54, 56, 58 and 60 of current source 16.

Serial to parallel converter 28 interfaces with MPU 12 and is comprised of a conventional eight bit serial to parallel shift register which allows MPU 12 to store status (for instance, keyboard status information) on chip of support circuit 10. Digital status information data is serially clocked into the registers at input 30 and is then transferred in parallel to audio and LED drivers 24 and 26 via data lines $D_0$–$D_7$ as converter 28 is enabled. The registers utilize conventional data latches and transfer buffers constructed using integrated injection logic ($I^2L$). A typical serial to parallel converter that can provide the function of converter 28 is the MC74HC595 serial to parallel converter manufactured by Motorola, Inc.

Data translator circuit 18 includes a pair of gain stages 62 and 64 for providing conversion between two logic levels. Hence, the keyboard electronics TTL data received from MPU 12 at terminal 66 is converted to RS423 logic levels via gain stage 62. Thus, the TTL level of 0.4 to 2.4 volts is converted to a single ended driver output having a minimum load voltage swing of +/−3.6 volts an supplied at terminal 68 to drive the load coupled thereat, which may be the main frame computer connected thereto by the interface bus as previously mentioned. Gain stage 64 converts the RS423 logic level information supplied at terminal 70 to compatible TTL levels. Hence, any information from the aforementioned main computer supplied to terminal 70 is converted to TTL and supplied to MPU 12 at terminal 72. Aforementioned U.S. Pat. No. 4,717,839 discloses basic gain cells that may be utilized for gain stages 62 and 64 and is incorporated herein by reference made hereto.

Oscillator 22 generates a square wave output that is supplied both to converter 20 and audio driver circuit 24. Oscillator 22 is a basic relaxation type oscillator wherein capacitor 90, which is externally coupled to support circuit 10 at terminal 92, is charged and discharged between two voltage levels as is well understood. A unique merge oscillator structure which is suited for providing the above described square wave drive signals is disclosed in aforementioned U.S. Pat. No. 4,734,536, the teachings of which are incorporated herein by reference made hereto.

The negative six volts RS423 voltage level for translator circuit 18 is generated on chip of support circuit 10 by +DC to −DC converter circuit 20. Converter circuit 20 is a two capacitor charge pump circuit that is driven by a square wave clock signal produced from oscillator 22. Two external capacitors 74 and 76 are used to produce the −6 volts and are coupled respectively to terminals 78,80 and 82,84. Diodes 80 and 88 are fabricated on chip and are collector-base shorted NPN and PNP transistor structures respectively. The $BV_{EBO}$ breakdown voltage values of the two diodes regulate the output voltage established at terminal 78 to approximately the −6 volts. The NPN/PNP diode structure is important as this allows the diodes to placed on chip while avoiding a forward biased epitaxial to substrate layer condition which otherwise would undesirably allow minority carrier injection into the substrate during the charge cycle.

During the positive swing of the charge pump external capacitor 74 is charged to approximately 6.7 volts, the typical $BV_{EBO}$ voltage. As the charge pump goes low the capacitor is pulled near ground transferring its charge to external capacitor 76. Aforementioned U.S. Pat. No. 4,698,737 discloses a charge pump circuit of the type described above and is incorporated herein by reference made hereto.

LED driver circuit 26 provides a plurality of output drive currents at outputs 96–102 which can be utilized to drive LEDs that may be connected thereto. Each output 96, 98, 100, 102 is coupled to an individual driver stage which in turns receives a ratioed current from current supply 16 and in accordance with a respective data control signal appearing at inputs $D_0$–$D_3$ converts the ratioed current to a level sufficient to drive a corresponding LED. Aforementioned U.S. Pat. No. 4,733,163 discloses an individual current driver stage that can be used for each of the LED driver stages referred to above and is incorporated herein by reference made hereto.

Audio driver circuit 24 is suited for driving an electromechanical sound transducer that would be connected to support chip 10 at terminal 94 and used to produce the synthesized key clicks and give audible status indications. The driver stage for audio driver circuit 24 is similar to the individual current drivers of LED driver circuit 26 and is described in the aforementioned referenced patent application. However, incorporated into the audio driver stage is a small digital to analog converter for simulating a somewhat logarithmic transfer function between the output current supplied to terminal 94 and the four bit digital word appearing on data lines $D_4$–$D_7$. The logarithmic characteristic is to compensate for the behavior of the transducer and the way the ear interpolates changes in volume.

Hence what has been descrbbed above is a novel single chip integrated support chip that may be utilized with a microprocessor to provide the functions of the electronics of a computer keyboard.

I claim:

1. A single chip microprocessor support integrated circuit for providing multiple functions of a computer keyboard interface, comprising:

a voltage regulator for providing a plurality of regulated voltages at respective outputs in response to an operating potential supplied thereto;

a resistor externally coupled to said voltage regulator at a first terminal for establishing a predetermined and substantially constant reference current;

current source means coupled to said voltage regulator for providing a plurality of distributed output currents at respective outputs the magnitudes of which are ratioed with respect to said reference current;

first driver circuit means coupled to respective outputs of said current source means for providing a plurality of output currents at respective outputs in response to a plurality of digital data control signals being supplied thereto, said output currents being level shifted in magnitude with respect to currents supplied thereto from said current source means;

second driver circuit means coupled to said current source means for providing an output current having a psuedologarithmic transfer characteristic in response to receiving digital data control signals and an oscillatory signal supplied thereto;

a converter circuit responsive to serially supplied data for providing said digital data control signals in parallel to said first and said second driver circuits;

an oscillator coupled to said current source means for providing said oscillatory signal, said oscillator including a capacitor coupled externally thereto at a second terminal; and circuit means coupled to said current source means and receiving an oscillatory signal from said oscillator for providing a negative voltage from a positive voltage supply, said circuit means including both a pair of PN diodes of opposite polarity formed in the integrated circuit and a pair of capacitors externally coupled thereto at a pair of respective terminals.

2. The circuit of claim 1 including a translator circuit for both converting TTL logic level data supplied thereto to RS423 logic level and for converting RS423 logic level data supplied thereto to TTL logic level.

* * * * *